United States Patent
Ortega et al.

(10) Patent No.: US 6,182,046 B1
(45) Date of Patent: *Jan. 30, 2001

(54) MANAGING VOICE COMMANDS IN SPEECH APPLICATIONS

(75) Inventors: Kerry A. Ortega, Deerfield Beach; Linda M. Boyer, Boca Raton; Thomas A. Kist, Boynton Beach; James R. Lewis, Delray Beach, all of FL (US); Barbara E. Ballard, Raleigh, NC (US); Ronald VanBuskirk, Indiantown; Arthur Keller, Boca Raton, both of FL (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/048,714

(22) Filed: Mar. 26, 1998

(51) Int. Cl.[7] .................................................. G10L 15/22
(52) U.S. Cl. .............................................. 704/275; 704/272
(58) Field of Search .................................. 704/275, 270, 704/272, 200

(56) References Cited

U.S. PATENT DOCUMENTS

| 5,386,494 | * | 1/1995 | White | 395/2.84 |
|---|---|---|---|---|
| 5,748,191 | * | 5/1998 | Rozack et al. | 395/333 |
| 5,754,873 | * | 5/1998 | Nolan | 707/527 |
| 5,864,819 | * | 1/1999 | De Armas et al. | 704/275 |
| 5,890,122 | * | 3/1999 | Van Kleeck et al | 704/275 |

OTHER PUBLICATIONS

IBM Technical Disclosure Bulletin. Integrated Audio Graphics User Interface, p. 368–371. Apr. 1991.*

* cited by examiner

Primary Examiner—Richemond Dorvil
(74) Attorney, Agent, or Firm—Quarles & Brady LLP

(57) ABSTRACT

A method for managing a What Can I Say (WCIS) function in an application having a plurality of commands which can be voice activated comprises the steps of: storing a set of substantially all voice activatable commands associated with the application; identifying those of the commands in the set which are displayable by the application; and, in response to a user input, displaying in a graphical user interface (GUI) a subset of the voice activatable commands which are not displayable by the application. Moreover, the method includes displaying in the GUI, in response to a user input, a list of the stored set of substantially all voice activatable commands associated with the application; displaying in the GUI a pull down menu identifying different categories by which the commands can be viewed in the list; and, displaying the GUI with a pull down menu identifying commands that can be performed against a voice command.

11 Claims, 4 Drawing Sheets

MANAGING VOICE COMMANDS IN SPEECH APPLICATIONS

BACKGROUND OF THE INVENTION

1. Field of the Invention

This invention relates to the field of managing speech applications, and in particular, to an improved "What Can I Say" function.

2. Description of Related Art

The What-Can-I-Say (WCIS) function is critical to speech product usability. WCIS is important even for experienced users. Even though a user's dependence may decrease as the user gains experience, there are always instances when even the most experienced user wants to know how to issue a voice command and whether or not a particular action is voice-enabled. The use of WCIS information is especially fundamental to a speech recognition application, where its usability is of major concern. All users, regardless of experience level, find usability value in the WCIS function.

Previous versions of speech products had WCIS functions. The problem with these previous versions is that the functionality was too complicated for the user to find the voice commands they were looking for. In the Simply Speaking Gold application, for example, the WCIS window used tabs for the different categories of commands. When the number of tabs exceeds four or five, the name of the command becomes harder to see and the overall look is very cluttered. Subcategories were indicated by using the "+" and "−" signs.

In previous designs of WCIS, all voice commands were shown even if it was otherwise quite evident to the users what the commands were. Previous versions of WCIS showed the complete menu structure of an application even though to navigate a menu item was as simple as saying the menu name. The same is true of buttons. This approach resulted in a very complicated structure for users to find voice commands.

SUMMARY OF THE INVENTION

Voice commands are much easier for the user to find in accordance with the inventive arrangements. The inventive arrangements are based on realization of a simple but elegant principle, namely that the user can always say what the user sees, and accordingly, a WCIS function only needs to show the commands a user cannot see. This principle enables the structure of a WCIS function to be greatly simplified by dividing voice commands into several categories and then only showing those voice commands that cannot be seen in the graphical user interface (GUI) of the speech application.

Functionality is further enhanced in the inventive arrangements by providing a simple alphabetic list of all the available voice commands that is easily searched. One of the reasons to provide such a list of all commands is to provide the user some way of training a command even though they can see it in the GUI.

A method for managing a What Can I Say (WCIS) function in an application having a plurality of commands which can be voice activated, in accordance with an inventive arrangement, comprises the steps of: storing a set of substantially all voice activatable commands associated with the application; identifying those of the commands in the set which are being displayed by the application; and, displaying in a graphical user interface, in response to a user input, a subset of the voice activatable commands which are not being displayed.

The method comprise the step of continuously tracking those of the commands in the set which are being displayed by the application or identifying those of the commands in the set which are being displayed by the application in response to the user input, prior to the displaying step.

The subset of the commands are advantageously arranged by category.

The method can further comprise the step of displaying in the GUI a list of the stored set of substantially all voice activatable commands associated with the application.

The method can further comprise the steps of providing the GUI with a pull down menu identifying different categories by which the commands can be viewed in the GUI and/or providing the GUI with a pull down menu identifying commands that can be performed against a voice command.

DETAILED DESCRIPTION OF THE PREFERRED EMBODIMENTS

The WCIS function can be made available to all speech aware applications on a computer system. Programmers can add their own view with their active commands to the WCIS function. Applications can also add their own view with their active commands to the WCIS function. For example, dictation applications can display inline commands, that is commands which are spoken during dictation, dictation macros and a Stop Dictation command in a WCIS GUI window, such as the WCIS GUI window shown in FIG. 1. When dictation stops, the WCIS window can be updated with a Begin Correction and other valid commands.

The general design for navigation by speech is to say what you can see, for example, the user can utter the name of a user interface control or command that the user sees, and the command will be executed. However, in accordance with the inventive arrangements, the WCIS accesses commands the user cannot see. Examples of Desktop commands which cannot be seen are GOTO <App name>, where app name is the name of a particular application the user wants to invoke, or ViaVoice commands like Microphone Off. The inventive arrangement assumes, in a sense, that the user knows about the basic rule of Say What You Can See. Therefore, the WCIS in accordance with the inventive arrangement advantageously does not show commands like menus, buttons and others that the user can currently see. The new WCIS function shows only those valid commands which the user cannot see, for example, global commands such as those that control a speech recognition application. In this way, the amount of information which must be displayed is significantly reduced, which greatly facilitates the ease with which the remaining commands can be accessed and displayed.

Most of the information in WCIS is divided into several categories. The user can access different views to see the different command names. The user accesses the categories via the WCIS View menu shown in FIG. 1. At the bottom of the WCIS window is an area where the user can type notes. As the user changes views the notes also change.

The WCIS window can be opened by the user choosing WCIS from a menu in a speech application or by using the voice command "What Can I Say." If the application had been invoked previously, the WCIS window can appear as it last did in the previous invocation of the application. If the application is being invoked for the first time, or no previous condition of the WCIS window is of record, the WCIS window advantageously defaults to a Search view. In addition, the user can also say "How Do I Say" to open the WCIS window and automatically display the Search view. The WCIS Search view has a list of all commands which can be uttered.

Figure 1:
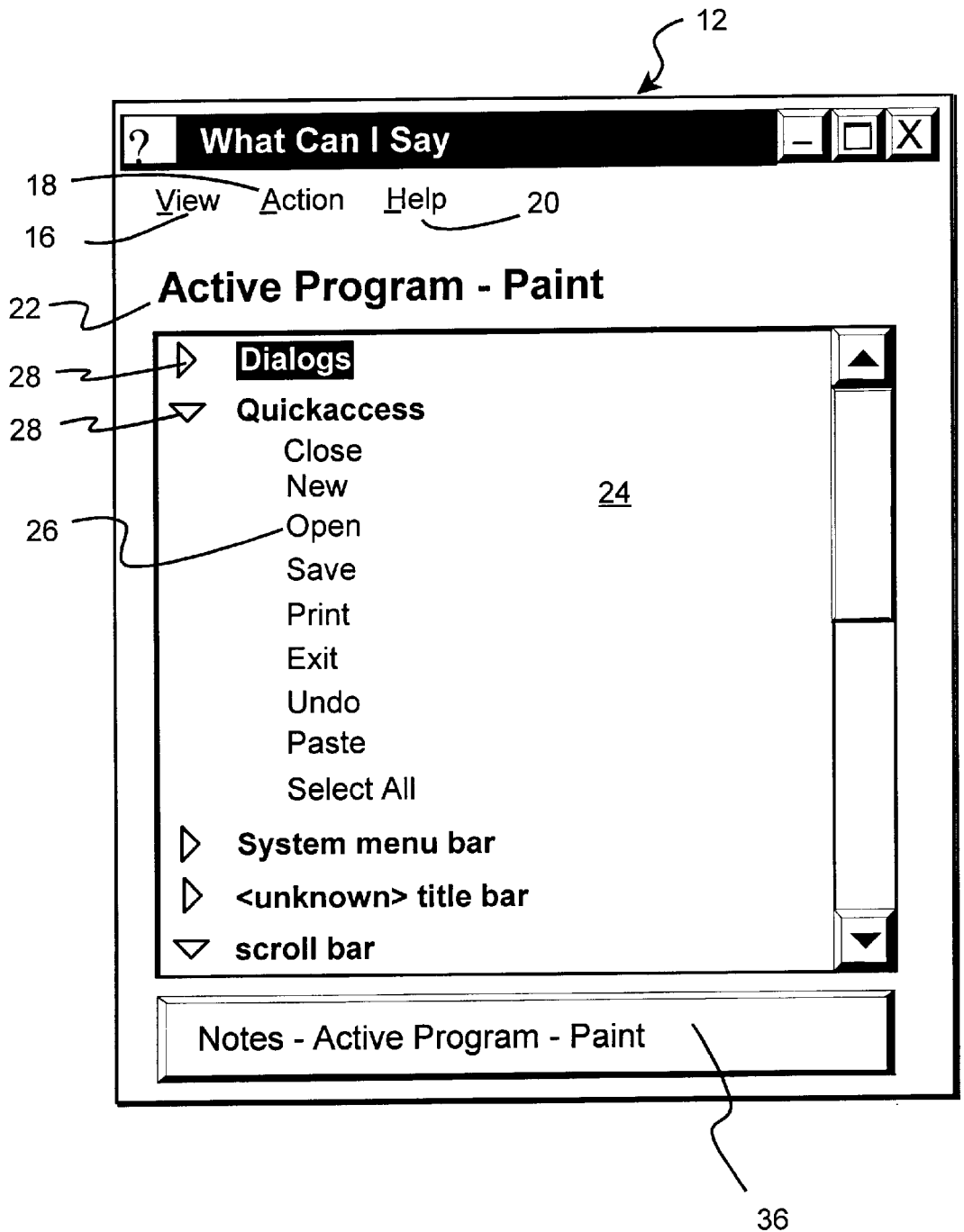
FIG. 1 is a GUI embodying of a WCIS Active Program view in accordance with the inventive arrangements.

FIG. 1 shows an example of a WCIS Active Program view in the form of a GUI 10 having a window 12. The list 26 of commands displayed in area 24 the Active Program view embodied in window 10 are the menu items that contain accelerator keys, also referred to as hot keys, and the user interface controls of the active program. The active program is also referred to as the program that has focus. The program with focus has the uppermost window and responds to inputs from the keyboard or other controllers. A dictation application operating with a drawing application, denoted Paint in the Figures, for example, will have included in the list 26 such commands as Close, New, Open, Save, Print, Exit, Undo, Paste, Select All, and the like. This view is present if the user has enabled Active Program commands when such functionality is available in a speech application.

Any WCIS view can be provided with pull down menus in an upper area 14 of the window or view. The menus can include, for example, a View menu 16, an Action menu 18 and a Help menu 20. The View and Action menus are described below. The Help menu is conventional and need not be explained. It should be noted that each of the menus can be invoked by uttering View, Actions and Help, or the like, depending upon the particular application.

Figure 3:
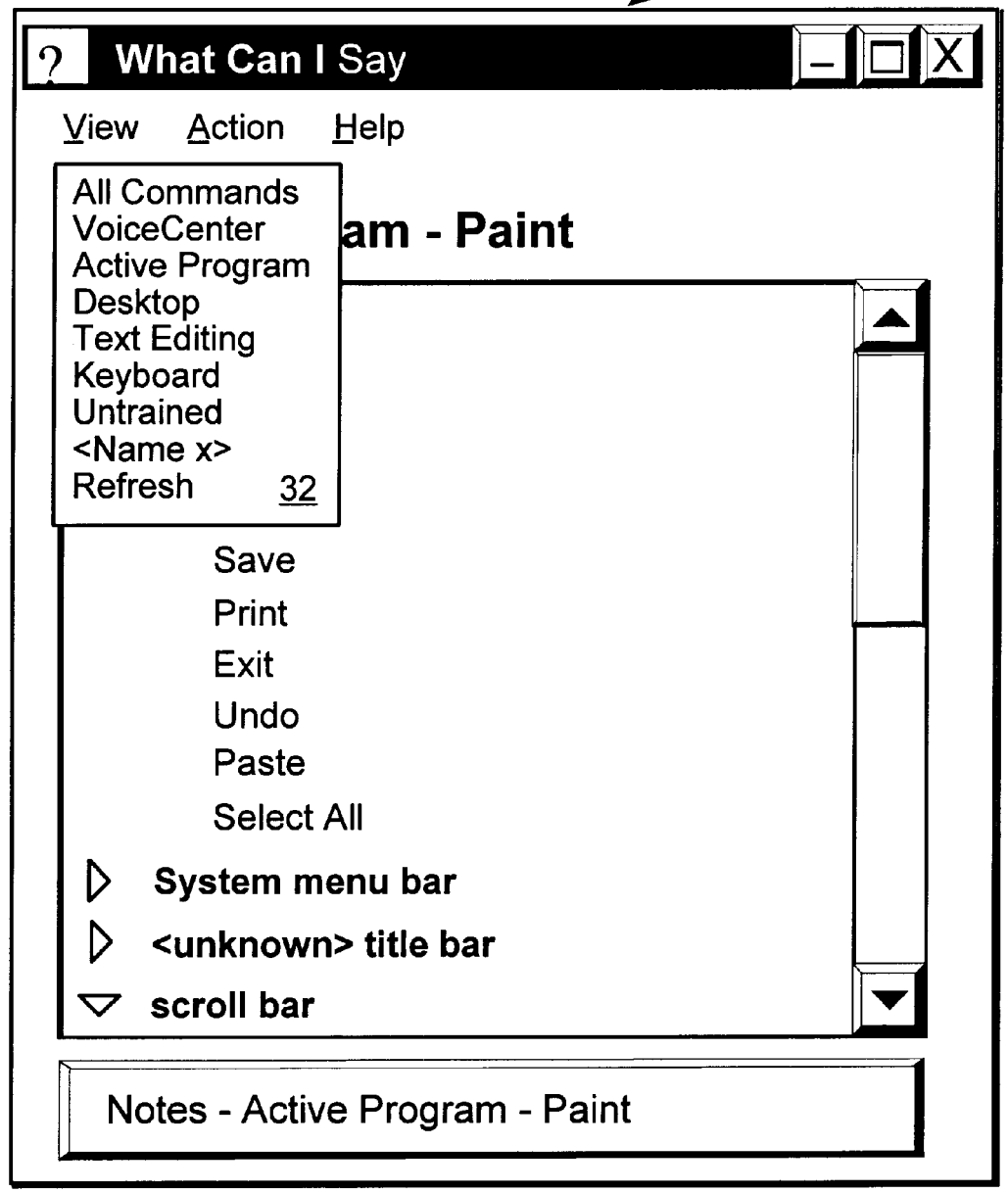
FIG. 3 is the GUI of FIG. 1, showing a list of commands available in the View pull-down menu.

The View menu 16 provides the different categories in which the speech commands can be provided. For example, the menu can contain a list 32 of the following categories, as shown in FIG. 3. All Commands brings up a special page on which users can specify synonyms for the command they are looking for. This view contains an alphabetic list of all the commands. Typing or dictating into the entry field on this page will only display matching commands. VoiceCenter lists the voice commands for a speech application called ViaVoice. Active Program contains Dialog controls, tool bar names and menu items with keyboard accelerator keys. The user can say these menu items even if they are not currently visible. If the user wants to Paste something from the clipboard, for example, instead of saying Edit and then Paste, the user can just say Paste because Paste has a keyboard accelerator, namely CTRL+V (simultaneously pressing the Control and V keys). Desktop contains the list of program names and associated program control commands like Start, Open, Goto, Minimize, Maximize and the like. Text Editing contains cursor movement, text editing, text selection and clipboard commands. Keyboard contains all the keyboard commands, for example Enter, Page down, and the like. Untrained is provided in the event the speech system does not have baseforms for all the commands of an application, because the application must be trained to understand such commands. A baseform is a description of how a word sounds or is pronounced. This view lists, alphabetically, all of the controls that do not have baseforms. The user can then select these commands and train them. The commands listed are for the current active window of the application. Accordingly, if a dialog is open, the untrained commands for that dialog are listed. <Name x> is a generic description for active applications. The developer of an application can provides one or more pages to place in the WCIS window. These commands are generally ones the user does not see. A dictation application, for example, would list the inline commands on this page. If the application does not supply anything, the page does not appear. The application can choose to change the information based on the state of their application. Keyboard accelerators are defined by the application. Refresh refreshes the window.

Figure 4:
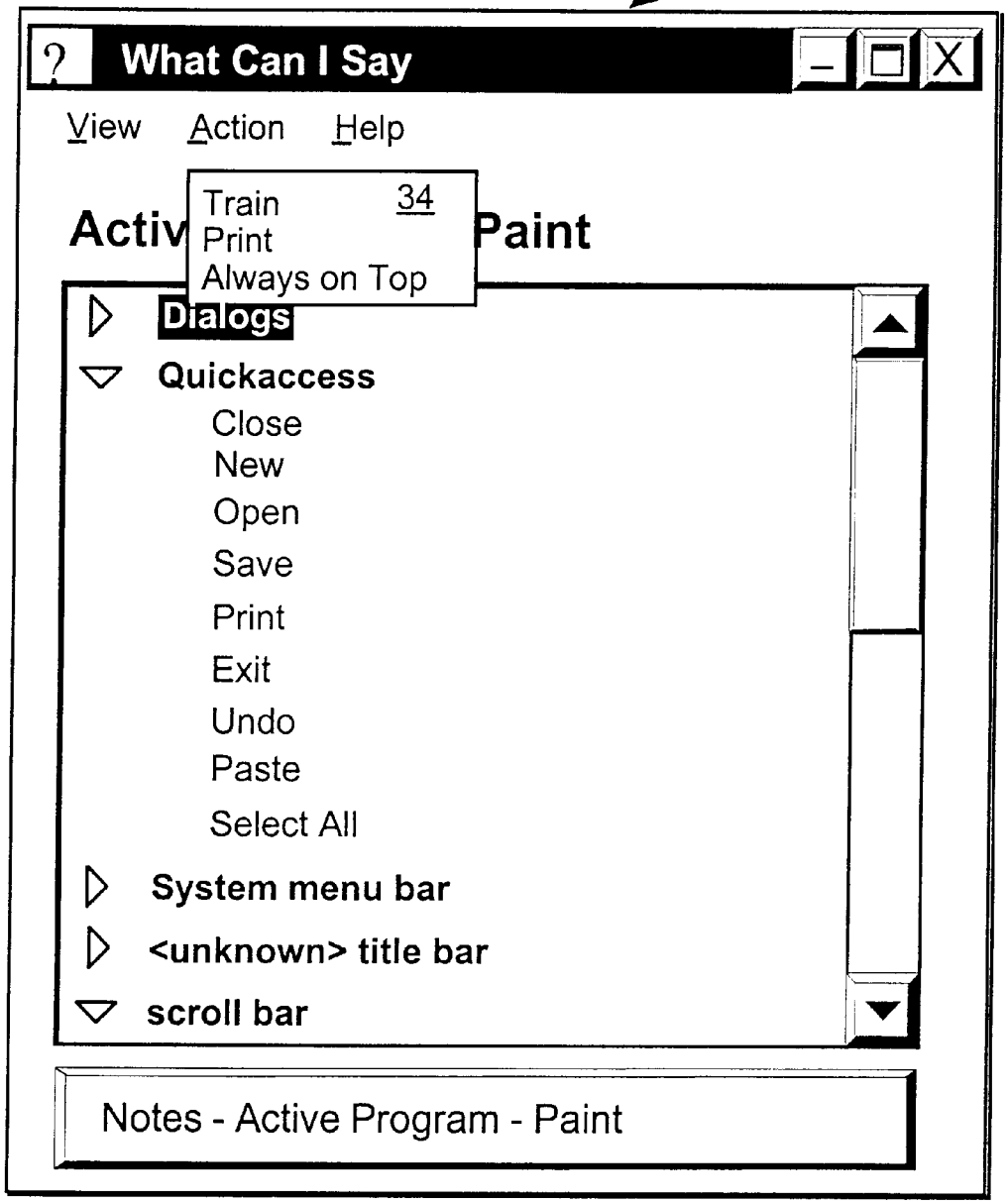
FIG. 4 is the GUI of FIG. 1, showing a list of commands available in the Action pull-down menu.

The Action menu 18 contains commands that can be performed against a voice command. The menu might contain a list 34 as shown in FIG. 4, including for example actions to do the following. Train brings up the train word dialog to train the command selected in the WCIS window. The Active Program page might show the command Skew, for example, which has no baseform. The user can select the command and then choose Train. Double-clicking on a command can also bring up this dialog. Print prints the current page. The user can select to Print as Shown or All Commands from the print dialog. Print as shown is the default. Always on Top forces the WCIS window to be on top of the active application.

Figure 2:
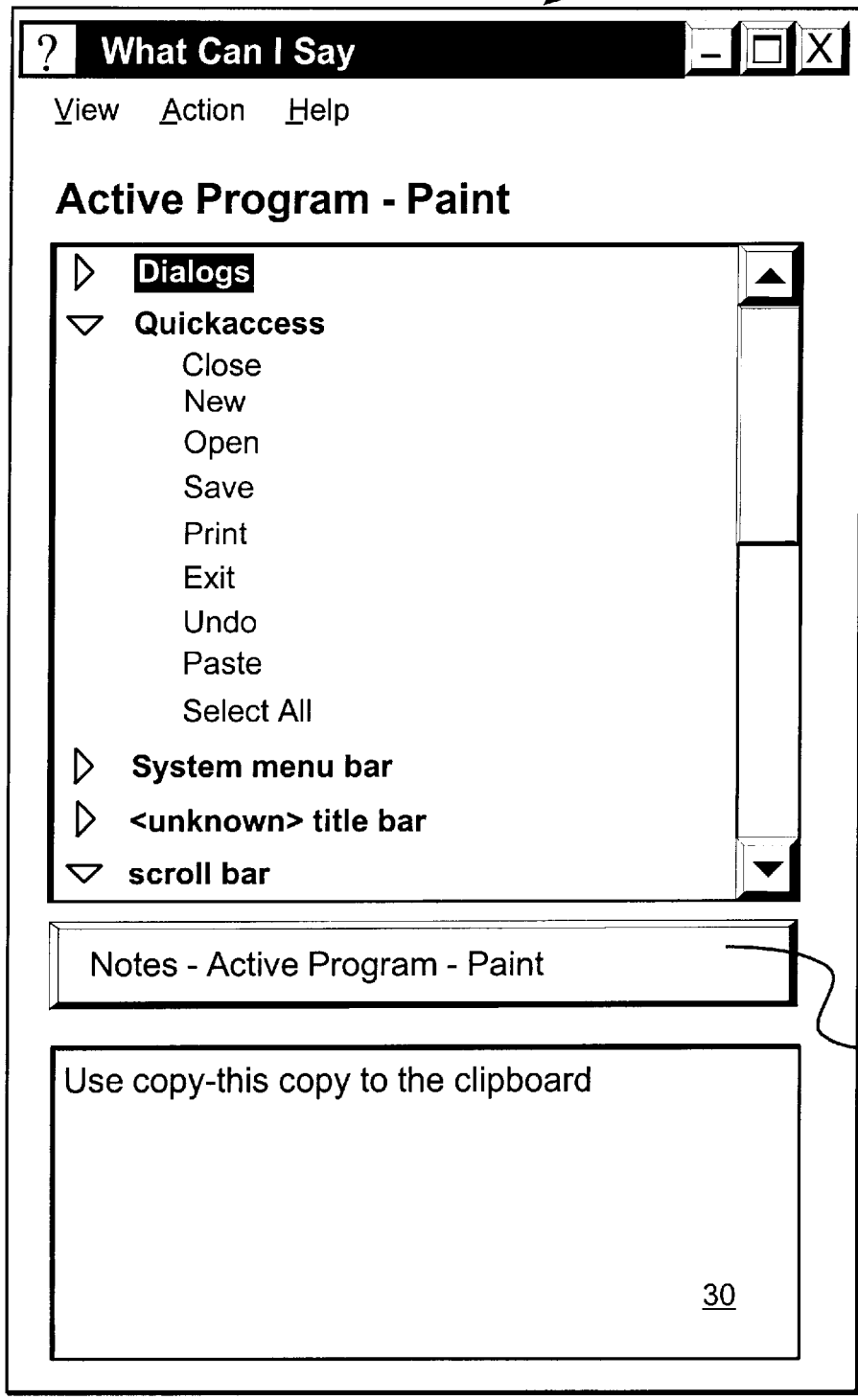
FIG. 2 is the GUI of FIG. 1, showing a Notes section.

A Notes section 30 of the WCIS Program view is shown in FIG. 2 and provides a free form edit field for reminders and the like. The Notes section opened by activating button 36 and appears at the bottom of the WCIS window 12. The user can type and/or dictate into this area. Each page has its own notes. As the user changes pages, the notes change. For the application pages, each application page has its own note and the system saves the user's notes across invocations, that is, across multiple starts and stops of the application. As the user switches between applications, the application's pages change as well as the notes associated with the application's pages. As the user switches to another application, the notes on the Active Program page change to those for the new active application. This section can be expanded and collapsed, for example, by a push button or other activatable icon.

The WCIS function advantageously searches for programs in the Windows Start button (of Windows 95, for example) and on the desktop and automatically populates its internal program list with them.

In general, the WCIS views use the turning triangles 28 for expanding or collapsing lists. The text in bold indicates subcategory names, that is, the ones associated with the turning triangles. The How Do I Say global command launches the WCIS window on the Search view, as noted above.

All commands can be searched by a Search view that comes up with the entry field blank and lists all the commands available. As the user types or dictates, the display field updates with the possible commands. Once the user enters a search string, only commands matching the search string are displayed in the list.

It will be appreciated that the commands which need to be displayed, and those which are not to be displayed, will change as the user changes applications and windows in the applications as different sets of commands are displayed. One means by which the displayed commands can be tracked is the active accessibility function provided by the Microsoft operating system.

The inventive arrangements taught herein provide a significantly more usable and user-friendly WCIS GUI than previous designs. The inventive arrangements are based on the notion of only showing commands that cannot be seen in the GUI. Categories of commands improve the ease of finding a specific command among those that are shown. A Search view looks at synonyms. Finally, a notes window is provided for each application, which survives successive invocations of the applications.

What is claimed is:

1. A method for managing a What Can I Say (WCIS) function in a first application having a plurality of commands each of which can be voice activated by a command word, comprising the steps of:

storing a set of substantially all voice activatable commands associated with said first application;

identifying those of said commands in said set which are displayable by said first application; and, in response to a user input, displaying in a graphical user interface of a second application a subset of said command words not displayable by said first application.

2. The method of claim 1, comprising the step of continuously tracking those of said commands in said set which are displayable by said first application.

3. The method of claim 1, comprising the step of identifying those of said commands in said set which are displayable by said first application in response to said user input, prior to said displaying step.

4. The method of claim 1, further comprising the step of arranging said subset of said commands by category.

5. The method of claim 1, further comprising the step of displaying in said GUI a list of said stored set of substantially all voice activatable commands associated with said first application.

6. The method of claim 1, further comprising the step of providing said GUI with a pull down menu identifying different categories by which said commands can be viewed in said GUI.

7. The method of claim 1, further comprising the step of providing said GUI with a pull down menu identifying commands that can be performed against a voice command.

8. A method for managing a What Can I Say (WCIS) function in a first application having a plurality of commands each of which can be voice activated by a command word, comprising the steps of:

storing a set of substantially all voice activatable commands associated with said first application;

identifying those of said commands in said set which are displayable by said first application;

in response to a first user input, displaying in a graphical user interface (GUI) of a second application a subset of said command words not displayable by said first application;

displaying in said GUI, in response to a second user input, a list of said stored set of substantially all voice activatable commands associated with said first application;

displaying in said GUI a first pull down menu identifying different categories by which said commands can be viewed in said list; and, displaying said GUI with a second pull down menu identifying commands that can be performed against a voice command.

9. The method of claim 8, comprising the step of continuously tracking those of said commands in said set which are displayable by said first application.

10. The method of claim 8, comprising the step of identifying those of said commands in said set which are displayable by said first application in response to said user input, prior to said displaying step.

11. The method of claim 8, further comprising the step of arranging said subset of said commands by category.

* * * * *